United States Patent
Mitani

(10) Patent No.: US 6,256,316 B1
(45) Date of Patent: Jul. 3, 2001

(54) COMMUNICATION METHOD IN CENTRALIZED SUPERVISORY SYSTEM

(75) Inventor: Kojun Mitani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/111,646

(22) Filed: Jul. 8, 1998

(30) Foreign Application Priority Data

Feb. 5, 1998 (JP) ................................................. 10-024248

(51) Int. Cl.⁷ ..................................................... H04L 12/28
(52) U.S. Cl. ........................ 370/422; 370/410; 370/422; 370/398
(58) Field of Search ................................. 370/410, 422, 370/377, 384, 385, 398, 216

(56) References Cited

U.S. PATENT DOCUMENTS

| | | | |
|---|---|---|---|
| 5,586,267 | * 12/1996 | Chatwani et al. | 709/223 |
| 5,953,338 | * 9/1999 | Ma et al. | 370/395 |
| 6,014,382 | * 1/2000 | Takihiro et al. | 370/399 |
| 6,021,113 | * 2/2000 | Doshi et al. | 370/228 |
| 6,026,091 | * 2/2000 | Christie et al. | 370/395 |
| 6,097,722 | * 8/2000 | Graham et al. | 370/395 |

FOREIGN PATENT DOCUMENTS

| | | |
|---|---|---|
| 498938 | 3/1992 | (JP). |
| 4288744 | 10/1992 | (JP). |
| 6169316 | 6/1994 | (JP). |

* cited by examiner

Primary Examiner—Wellington Chin
Assistant Examiner—Brenda Pham
(74) Attorney, Agent, or Firm—Helfgott & Karas, P.C.

(57) ABSTRACT

In a centralized supervisory system having a plurality of individual supervisory devices which assembles control signal cells and main signal cells into frames and send the frames, and a centralized supervisory device which collects the supervisory information included in the control signal cells from the individual supervisory devices and sends the main signal cells to a network, maximum bands for control signals are determined, for the respective individual supervisory devices, on the basis of lengths of respective data to be transmitted. In each of the individual supervisory devices, a given number of control signal cells are arranged in each frame so that the control signals are transmitted within the maximum band. Then, the frames are sent to the centralized supervisory device.

5 Claims, 17 Drawing Sheets

FIG.2

| NO. | PERFORMANCE DATA |
|---|---|
| (1) | Severely Error Cell Blocks (SECBs)--- |
| (2) | Error Cells--- |
| (3) | Lost 0+1 Information Cells--- |
| (4) | Lost 0 User Information Cells--- |
| (5) | Misinserted User Information Cells--- |
| (6) | Number of Transmitted 0+1 User Information Cells--- |
| (7) | Number of Transmitted 0 User Information Cells--- |
| (8) | Impaired Blocks--- |
| (9) | Total Lost 0+1 User Information Cells--- |
| (10) | Total Lost 0 User Information Cells--- |
| (11) | SECB errored--- |
| (12) | SECB misinserted--- |
| (13) | Excessive Cell Transfer Delay Events--- |

FIG.5

|  | STANDARD BAND | MAXIMUM BAND | STANDARD TRANSFER TIME |
|---|---|---|---|
| MAIN SIGNAL | SBs | MBs | Ts |
| CONTROL SIGNAL | SBc | MBc | Tc |

FIG.11

| | | |
|---|---|---|
| SUPERVISION | 00001 | 001 : INVENTORY<br>010 : ALM<br>011 : STT<br>100 : FM1V S/W Ver. |
| Prov | 00010 | 001 : CH COMMON Prov<br>010 : CH INDEPENDENT Prov<br>011 : SERVICE STATE<br>100 : ACT/DACT<br>101 : CRC THRS VALUE<br>110 : B.W ASSIGN |
| CONTROL | 00011 | 001 : LED INFORMATION<br>010 : H.K Cont.<br>011 : PWR Cont.<br>100 : CH STATE COLLECT |
| SCAN | 00100 | 001 : SCANNING INFORMATION<br>010 : SCANNING RESET INFORMATION<br>011 : SCANNING RESTART |
| COMMAND | 00101 | 001 : COMMAND EXECUTE<br>010 : COMMAND RESULT |

COMMUNICATION METHOD IN CENTRALIZED SUPERVISORY SYSTEM

BACKGROUND OF THE INVENTION

The present invention relates to methods for communications between terminals in a centralized supervisory system, and more particularly to a method for a communication between terminals in a centralized supervisory system equipped with a centralized supervisory device which collects supervisory information included in control signal cells sent from individual supervisory devices and sends main signal cells to a network.

Recently, communications in an asynchronous transfer mode (ATM) have been in the spotlight as a communication method due to diversification of communication services. When an ATM communication takes place, an ATM terminal assembles a cell of a setup message including a sender number and a receiver number and sends the cell to an ATM network. Upon receiving the cell for setup, the ATM network establishes a VCC (Virtual Channel Connection) between the sender terminal and the receiver terminal, and notifies the sender and receiver terminals of respective connection identifiers VPI and VCI (Virtual Path Identifier and Virtual Channel Identifier) used in the communication. Then, the sender terminal segments data into cells and adds the notified connection identifiers to the header of each cell. Then, the cells are sent via the line. Each switch in the ATM network performs switching while changing the values of the connection identifiers of the input cells. The receiver terminal accepts the cells each having the specified connection identifiers, and disassembles the cells into data.

A plurality of ATM terminals can be accommodated in the ATM network as follows. The ATM terminals are connected to first transmission devices which implement an UNI (User Network Interface). The first transmission devices are connected to a second transmission device, which is connected to the ATM network. In such a structure, an individual supervisory device provided in each of the first transmission devices supervises the line quality (performance) and a fault state (alarm), and sends the supervisory information thereon to a centralized supervisory device provided in the second transmission device. The centralized supervisory device collects and manages the supervisory information sent from the supervisory devices, and outputs it to an external device such as a personal computer.

FIG. 15 is a block diagram of a conventional centralized supervisory system in which the supervisory function of the system is mainly illustrated. Referring to FIG. 15, there are illustrated individual supervisory devices (first transmission devices) $1_1–1_n$, a centralized supervisory device (second transmission device) 2, an ATM network 3, and an MMI (Man Machine Interface) unit 4. A large number of ATM terminals are connected to each of the individual supervisory devices $1_1–1_n$, which are connected to the centralized supervisory device. The MMI unit 4 is a personal computer, a workstation or the like.

FIG. 16 schematically shows a communication part of each of the individual supervisory devices $1_1–1_n$. The communication part is made up of a supervisory information memory 1a, a processor (CPU) 1b, a frame assemble/cell separate part 1c, and a cell assemble/disassemble part 1d. The supervisory information memory 1a stores the collected supervisory information. The supervisory items of the individual supervisory devices include the fault state (alarm) and the line quality (performance). The frame assemble/cell separate part 1c assembles the cells (the main signal cells and control signal cells) into a frame which conforms with, for example, the SONET OC3 level, and sends the OC3 frame to a transmission line (optical fiber) TL. Further, the frame assemble/cell separate part 1c separates the received OC3 frame into the main signal cells and control signal cells. The cell assemble/disassemble part 1d assembles a control signal from the CPU 1b into control signal cells, and disassembles control signal cells supplied from the frame assemble/cell separate part 1c into the control signal, which is input to the CPU 1b. The control signal cells are cells which are used to transfer the supervisory information between the individual supervisory devices $1_1–1_n$ and the centralized supervisory device 2, and is equipped with a particular connection identifier (VPI/VCI) directed to discriminating the control signal cell from the main signal cells. The main signal cells are cells which are received from the ATM terminals and are sent thereto.

FIG. 17 is a diagram of a frame format of the SONET OC3 signal. One frame consists of 9×270 bytes. The first 9×9 bytes form the section overhead SOH, and the remaining bytes form the path overhead POH and the payload PL. The section overhead SOH is used to transmit information indicating the beginning of the frame (framing signal), information inherent in the transmission line (information concerning error on the transmission line and information for maintenance of the network), and a pointer indicating the position of the path overhead POH. The path overhead POH is used to transmit end-to-end supervisory information in the network. The payload PL is used to transmit information at a bit rate of 150 Mbps so that a large number of cells (main signal cells and control signal cells) CL1–CLn are mapped therein.

FIG. 18 schematically shows a communication part of the centralized supervisory device 2. The communication part shown in FIG. 18 is made up of a supervisory information memory 2a, a processor (CPU) 2b, a frame assemble/cell separate part 2c, and a cell assemble/disassemble part 2d. The supervisory information memory 2a stores the supervisory information collected from the individual supervisory devices $1_1–1_n$. The frame assemble/cell separate part 2c assembles the cells (the main signal cells and control signal cells) into a frame which conforms with, for example, the SONET OC3 level, and sends the OC3 frame to a transmission line (optical fiber) TL. Further, the frame assemble/cell separate part 2c separates the OC3 frame received over the transmission line TL into the main and control signal cells. The cell assemble/disassemble part 2d assembles a control signal from the CPU 2b into control signal cells, and disassembles control signal cells supplied from the frame assemble/cell separate part 2c into a control signal, which is then input to the CPU 2b.

FIG. 19 is a diagram of a supervisory sequence in which the centralized supervisory device 2 collects the supervisory information from the individual supervisory devices $1_1–1_n$. The CPU 2b of the centralized supervisory device 2 sends a polling cell to the individual supervisory device $1_1$ via the cell assemble/disassemble part 2d and the frame assemble/cell separate part 2c. The frame assemble/cell separate part 1c of the individual supervisory device $1_1$ supplies the received polling cell to the CPU 1b via the cell assemble/disassemble part 1d. The CPU 1b checks whether there is a change in the supervisory information between the previous polling and the current polling. If it is judged that there is no change, the CPU 1b sends an ACK cell to the centralized supervisory device 2 via the cell assemble/disassemble part 1d and the frame assemble/cell separate part 1c.

The CPU 2b of the centralized supervisory device 2 receives the ACK signal via the frame assemble/cell separate part 2c and the cell assemble/disassemble part 2d, and thus recognizes that there is no change in the supervisory information on the individual supervisory device $1_1$. Then, the CPU 2b sends the polling cell to the next individual supervisory device $1_2$. If there is a change in the supervisory information on the individual supervisory device $1_2$, the CPU 1b thereof assembles changed supervisory information (change data) into the cell, which is then sent to the centralized supervisory device 2. Then, the centralized supervisory device 2 extracts the change data from the received cell, and revises the old data in the supervisory information memory 2a by using the change data. The frame assemble/cell separate part 1c of the individual supervisory device $1_2$ inserts the control signal cells (supervisory information cells) into the main signal cells at a fixed rate. Then, the main signal cells are framed and sent to the transmission line. That is, the frame assemble/cell separate part 1c maps a number of control signal cells corresponding to the fixed rate in the payload PL of the SONET OC3, and sends the mapped control signal cells to the transmission line. The CPU 2b of the centralized supervisory device 2 receives all change data, and thereafter sends the polling cell to the next individual supervisory device $1_3$. Then, the supervisory information is collected and managed in the same sequence as described above.

The conventional communication method has an advantage in terms of cost because control paths (VPI/VCI) are provided in the main signal cables connecting the first transmission devices (individual supervisory devices) $1_1$–$1_n$ and the second transmission device (centralized supervisory device) located in remote areas and there is thus no need for cables specifically used for the control paths.

However, the conventional communication method handles a large number of items of the supervisory information. Hence, the conventional communication method in which the control signal cells are sent at the fixed rate has a disadvantage in that, if an individual supervisory device starts to send a large amount of data, the polling signal will be sent to the next supervisory device with a time delay.

There is another disadvantage in that the centralized supervisory device 2 sends, with a time delay, a command required for real-time performance to the individual supervisory device which starts to send a large amount of data.

SUMMARY OF THE INVENTION

Thus, it is an object of the present invention to reduce the time it takes for the individual supervisory devices to send a large amount of data such as supervisory data within a specified time.

The above object of the present invention is achieved by: determining, for individual supervisory devices, respective maximum bands for control signals on the basis of lengths of respective data to be transmitted; arranging, in each of the individual supervisory devices, a given number of control signal cells in each frame so that the control signals are transmitted within the maximum band; and sending, via transmission line, the frame to a centralized supervisory device from each individual supervisory device. That is, according to the present invention, the maximum band for the control signal in each individual supervisory device is determined based on the length of data to be transmitted, and the control signal cells are transmitted at a high speed. Hence, necessary data can be transmitted to a remote party within a specific time.

Also, the present invention may further include the steps of: (1) sequentially sending a polling cell for collecting the supervisory information to the individual supervisory devices; (2) sending, from each of the individual supervisory devices in response to the polling cell, the length of data to be transmitted to the centralized supervisory device; and determining, in the centralized supervisory device, the maximum band for the control signal for each of the individual supervisory device on the basis of the length of the data and notifying the maximum band thus determined to the individual supervisory device, wherein each of the individual supervisory devices sends the control signal cells to the centralized supervisory device within the maximum band. Hence, necessary data can be transmitted to a remote party within a specific time.

The present invention may be configured so that the step of determining the respective maximum band comprises steps of: setting, for each of the individual supervisory devices, a standard band and a standard transfer time for the control signals; computing a transfer time in the standard band by dividing the corresponding length of data by the standard band; comparing the transfer time thus computed with the standard transfer time; and computing the sum of the standard band and $\alpha$ (>0) and setting the sum as the maximum band for the control signals if the transfer time computed is longer than the standard transfer time. Hence, necessary data can be transmitted to a remote party within a specific time. Additionally, the communication time can be reduced so that real-time performance can be ensured and thus the reliability of system maintenance can be improved.

The present invention may be configured so that the step of determining the maximum band comprises a step of setting the standard band as the maximum band for the control signals if the transfer time computed is equal to or shorter than the standard transfer time. Hence, it is possible to prevent main signal cells from being discarded and thus ensure the services for the main signals.

The present invention may further include the steps of: supervising, in each of the individual supervisory devices, an increase in the number of main signal cells; and reducing the maximum band for the control signals to the standard band and increasing the maximum band for the main signal if the number of main signal cells is increased while the control transfer cells are being transferred at the maximum band determined. Hence, it is possible to prevent main signal cells from being discarded and thus ensure the services for the main signals.

Other features and advantages of the present invention will be apparent from the following detailed description taken in conjunction with the accompanying drawings.

BRIEF DESCRIPTION OF THE DRAWINGS

FIG. 2 is a diagram showing performance items related to a main signal;

FIG. 5 is a diagram showing a flow rate control table;

FIG. 11 is a diagram showing types of information;

Figure 1:
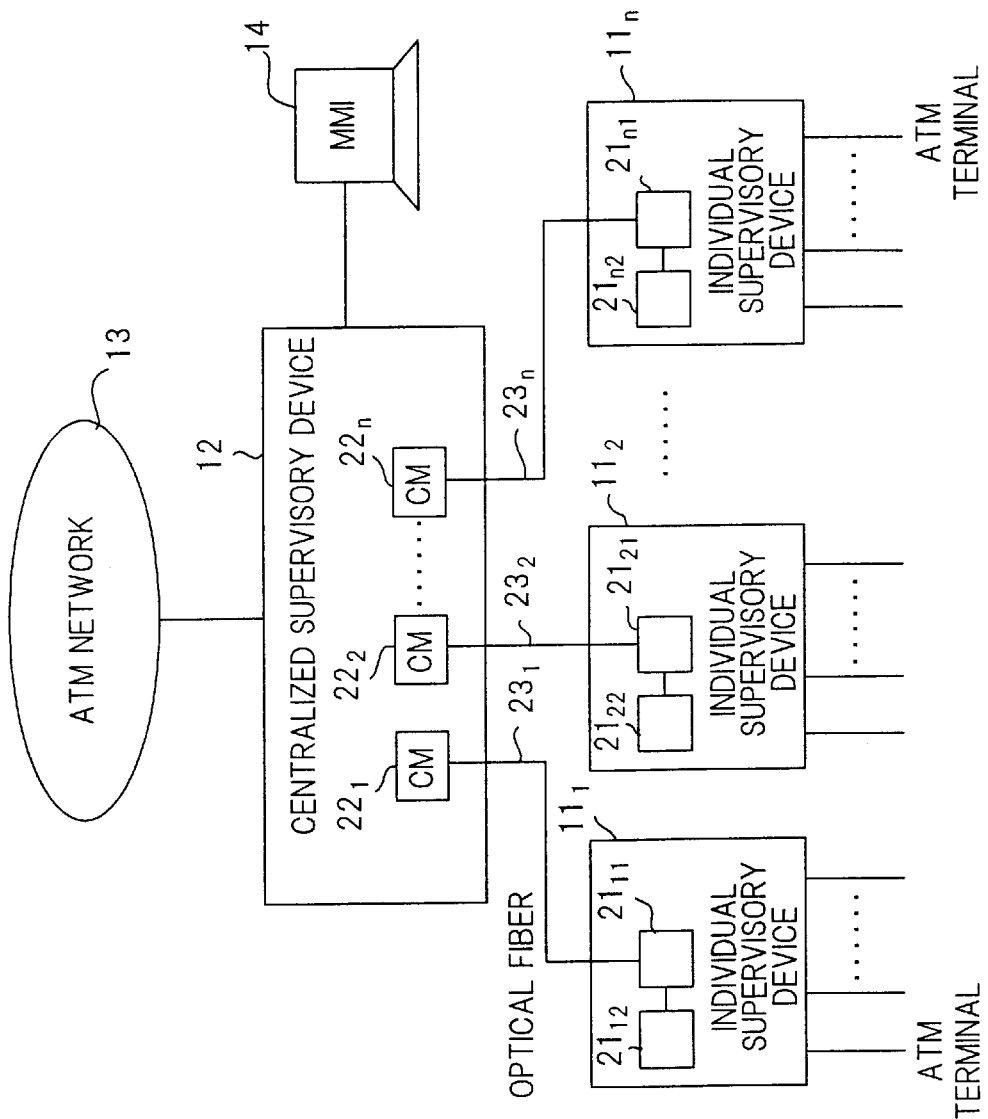
FIG. 1 is a diagram of a structure of a centralized supervisory system.

DESCRIPTION OF THE PREFERRED EMBODIMENTS (a) Structure of Centralized Supervisory System of the Present Invention:

FIG. 1 is a diagram of a structure of a centralized supervisory system of the present invention. The system includes individual supervisory devices $11_1$–$11_n$ having an identical structure, a centralized supervisory device 12, an ATM network 13, and an MMI unit 14 such as a personal computer or workstation. A large number of ATM terminals are connected to each of the individual supervisory devices $11_1$–$11_n$, which are connected to the centralized supervisory device 12. The individual supervisory devices $11_1$–$11_n$ respectively have communication parts $21_{11}$–$21_{n1}$ and supervisory information collecting parts $21_{12}$–$21_{n2}$. The centralized supervisory device 12 has communication parts $21_1$–$21_n$, which have an identical structure and are respectively provided to the communication parts $21_1$–$21_n$ of the individual supervisory devices $11_1$–$11_n$. Transmission lines $23_1$–$23_n$ are provided as shown, and are formed of optical fibers over which frames conforming with, for example, the SONET OC3 or OC12 can be transmitted.

Figure 3:
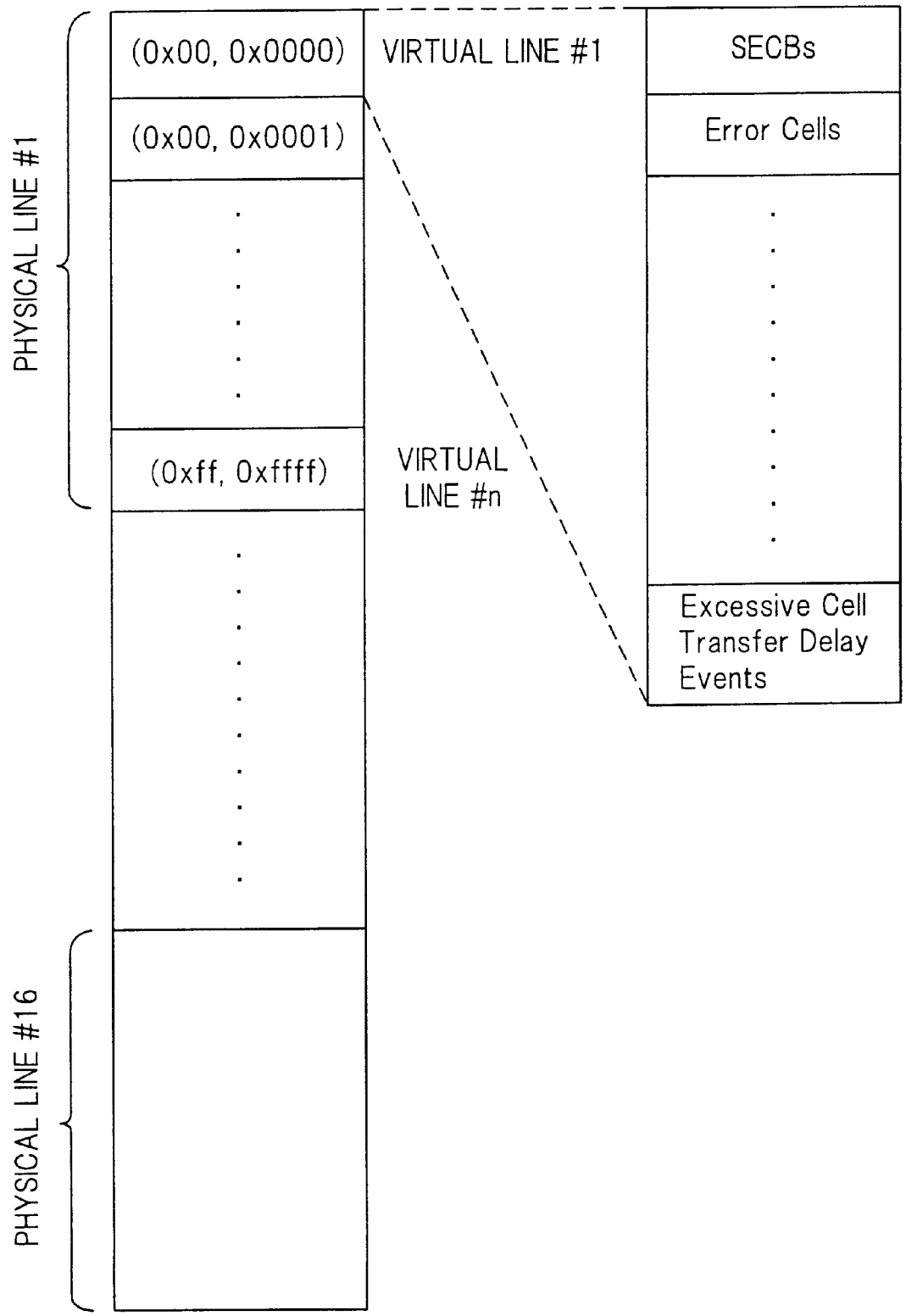
FIG. 3 is a diagram showing performance data stored in a memory.

The individual supervisory devices $11_1$–$11_n$ have supervisory items including the fault state (alarm) and the line quality (performance). Particularly, there are many supervisory items regarding the ATM. For example, eight individual supervisory devices $11_1$–$11_8$ are connected to the centralized supervisory device 12, and 16 physical lines (ATM terminals) can be connected to each of the individual supervisory devices $11_1$–$11_8$ at maximum. Each of the physical lines accommodates virtual lines ($2^8 \times 2^{16}$ at maximum) formed by the VPI of eight bits and the VCI of 16 bits. Performance items (1) through (13) shown in FIG. 2 are defined for each of the virtual lines (see Standards GR-1248-CORE of Bellcore). Hence, the supervisory information collecting parts $21_{12}$–$21_{82}$ of the individual supervisory devices $11_1$–$11_8$ supervise the performance (supervisory) items, and stores the supervisory information obtained for the performance items in supervisory information memories. As shown in FIG. 3, each of the supervisory memories has memory areas provided for the respective virtual lines, and the performance items (items to be supervised) are stored in each of the above memory areas. Although the performance items shown in FIG. 2 are related to the main signal, there are performance items which are related to cells for OAM (Operation, Administration and Maintenance) and cells for a control protocol.

In FIG. 2, the performance items (3) and (4) or (9) and (10) are discriminated over each other due to the fact as to whether cells are discarded in the own device or another device.

Figure 4:
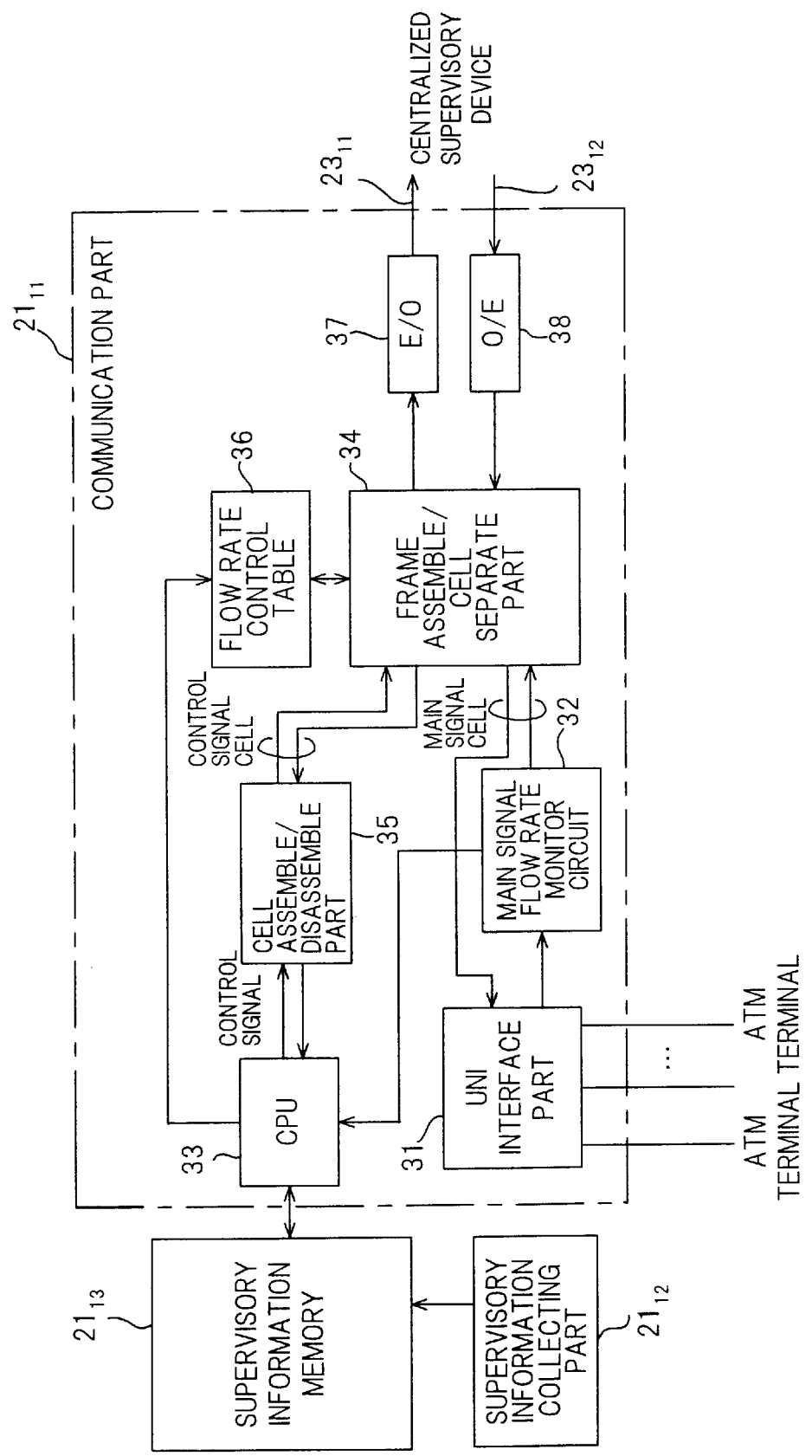
FIG. 4 is a diagram of a structure of a communication part of an individual supervisory device.

(b) Structure of Communication Part in Individual Supervisory Device:

FIG. 4 is a diagram of a structure of a communication part $21_{11}$ of the individual supervisory device $11_1$. The communication part $21_{11}$ is connected to a supervisory information memory $21_{13}$ to which the supervisory information collecting part $21_{12}$ is connected. The supervisory information collecting part $21_{12}$ collects the supervisory information such as the fault state (alarm) and line quality (performance). The supervisory information memory $21_{13}$ stores the collected supervisory information.

The communication part $21_{11}$ includes a UNI interface part 31, a main signal flow rate monitor circuit 32, a processor (CPU) 33, a frame assemble/cell separate part 34, a cell assemble/disassemble part 35, a flow rate control table 36, an electrical-to-optical converter (E/O) 37, and an optical-to-electrical converter (O/E) 38.

The UNI interface part 31 is connected to ATM terminals and realizes the UNI interface. The main signal flow rate monitor circuit 32 supervises the flow rates of the up main signal cells from the ATM terminals. The frame assemble/cell separate part 34 assembles the cells (main signal cells and control signal cells) into, for example, a SONET OC3 frame, which is then sent to a transmission line $23_{11}$, and separates a SONET OC3 frame received via a transmission line $23_{12}$ into main and control signal cells. The cell assemble/disassemble part 35 assembles a control signal from the CPU 33 into control signal cells, and disassembles control signal cells from the frame assembly/cell separate part 34 into a control signal, which is then input to the CPU 33. The control signal cells handled by the CPU 33 are cells used to transfer the supervisory information and the control signal between the individual supervisory device $11_1$ and the centralized supervisory device 12, and are respectively equipped with a particular connection identifier (VPI/VCI) directed to discriminating the control signal cell over the main signal cells. The main signal cells are cells which are received from the ATM terminals and are sent thereto. The flow rate control table 36 stores, as shown in FIG. 5, standard bands SBs and SBc, maximum bands MBs and MBc, and standard transfer times Ts and Tc for the main and control signal cells, respectively. The electrical-to-optical converter 37 converts an electrical signal from the frame assemble/cell separate part 34 into an optical signal, and outputs the optical signal to the transmission line $23_{11}$. The optical-to-electrical converter 38 converts an optical signal from the transmission line $23_{12}$ into an electrical signal, which is then supplied to the frame assemble/cell separate part 34.

Figure 6:
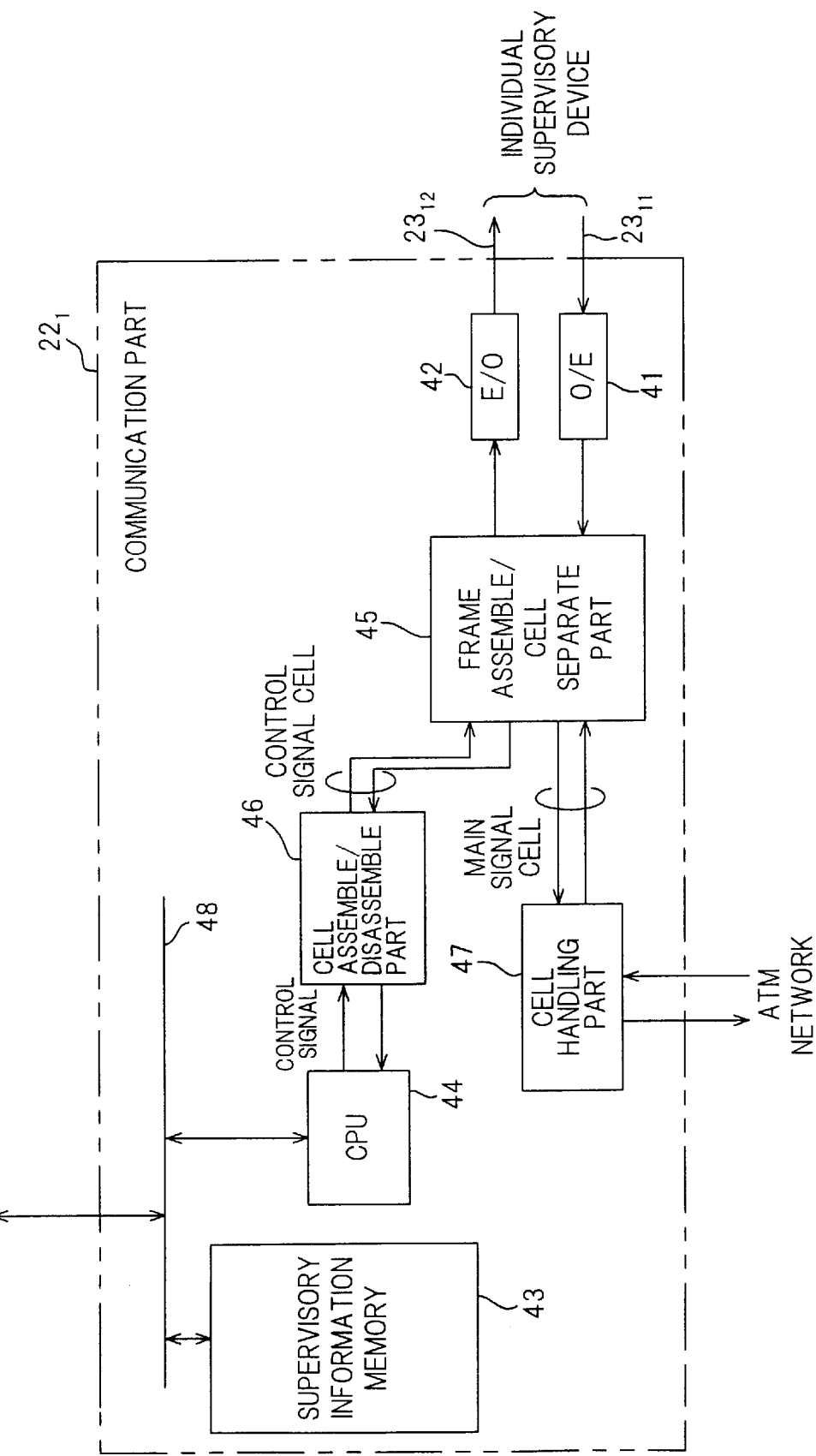
FIG. 6 is a diagram of a structure of a communication part of a centralized supervisory device.

(c) Structure of Communication Part of Centralized Supervisory Device:

FIG. 6 is a diagram of a structure of the communication part $22_1$ of the centralized supervisory device 12. Each of the other communication parts $22_2$–$22_8$ has the same structure as shown in FIG. 6. The communication part $22_1$ includes an optical-to-electrical converter (O/E) 41, an electrical-to-optical converter (E/O) 42, a supervisory information memory 43, a processor (CPU) 44, a frame assemble/cell separate part 45, a cell assemble/disassemble part 46, a cell handling part 47, and an internal bus 48.

The optical-to-electrical converter 41 converts an optical signal supplied from the individual supervisory device 11$_1$ via the transmission line 23$_{11}$ into an electrical signal, which is then supplied to the frame assemble/cell separate part 45. The electrical-to-optical converter 42 converts an electrical signal from the frame assemble/cell separate part 45 into an optical signal, which is then output to the individual supervisory device 11$_1$ via the transmission line 23$_{12}$. The supervisory information memory 43 stores supervisory information supplied from the individual supervisory device 11$_1$. The frame assemble/cell separate part 45 assembles the cells (main signal cells and control signal cells) into, for example, a SONET OC3 frame, which is then sent to the transmission line 23$_{11}$, and separates a SONET OC3 frame received via the transmission line 23$_{12}$ into main signal cells and control signal cells. The cell assemble/disassemble part 46 assembles a control signal from the CPU 44 into control signal cells, and disassembles control signal cells from the frame assemble/cell separate part 45 into a control signal, which is then input to the CPU 44. The cell handling part 47 executes a predetermined process for the main signal cells. The internal bus 48 is connected to a CPU (not shown), which controls the overall centralized supervisory device 12 and collects the supervisory information concerning the individual supervisory device 11$_1$ stored in the supervisory information memory 43.

Figure 7:
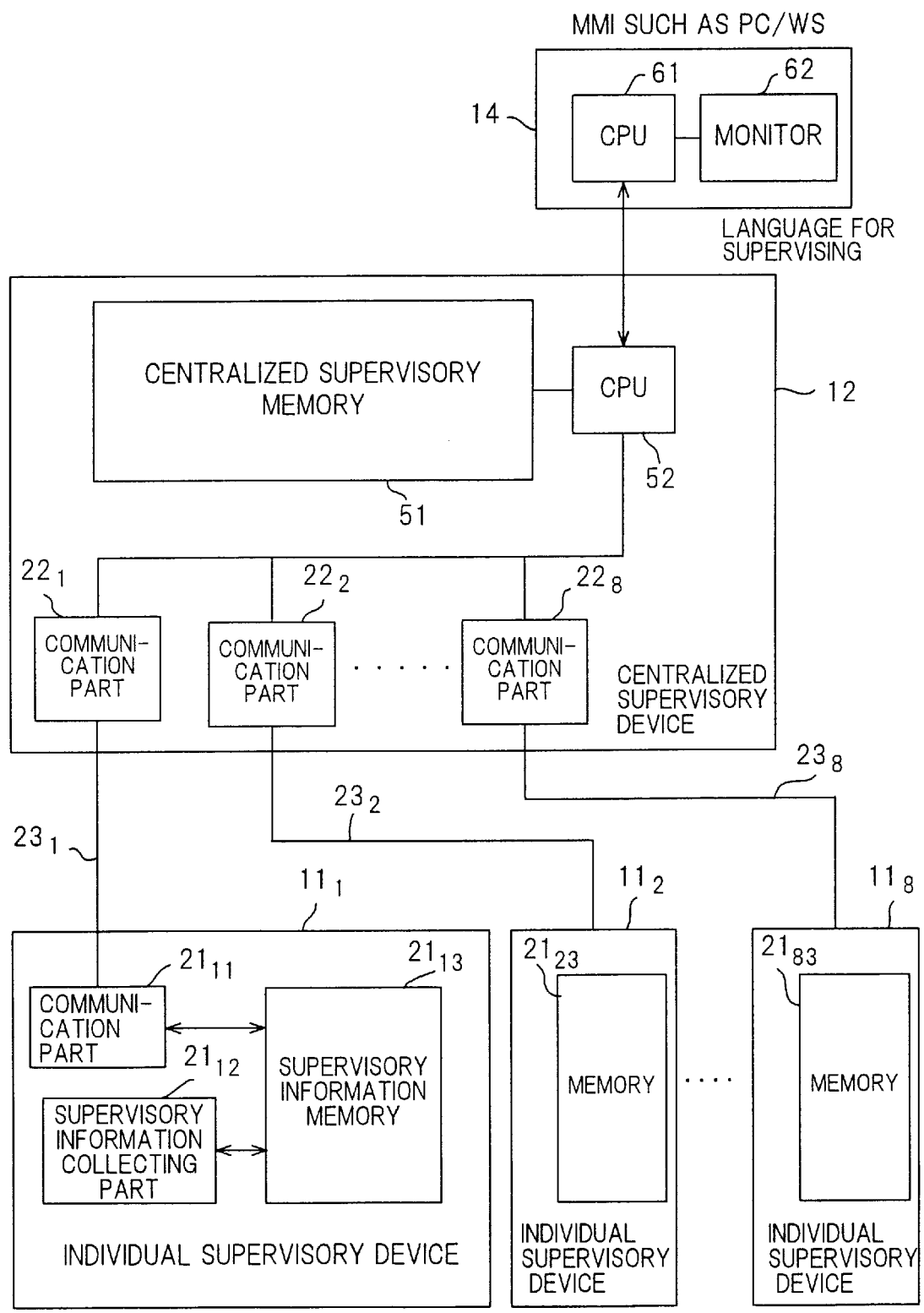
FIG. 7 is a diagram of essential parts of the centralized supervisory device.

(d) Structure of Essential Parts of Centralized Supervisory System:

FIG. 7 is a diagram of a structure of essential parts of the centralized supervisory system, in which parts that are the same as those shown in FIGS. 1 through 6 are given the same reference numbers. The centralized supervisory device 12 includes a centralized supervisory memory 51 in which the supervisory information concerning the individual supervisory devices 11$_1$–11$_8$ is stored, and a CPU 52, which controls the overall centralized supervisory device 12. More particularly, the CPU 52 collects the latest states of the supervisory (performance) items from all the individual supervisory devices 11$_1$–11$_8$, and stores the collected latest states in the memory 51. Further, the CPU 52 performs a control in which the supervisory information (which will also be referred to as performance data) can be output to the outside of the device 12 as necessary (for example, if an abnormal state occurs or a given request is issued). The MMI device 14 includes a CPU 61, and a monitor 62 on which the performance data is displayed.

Figure 8:
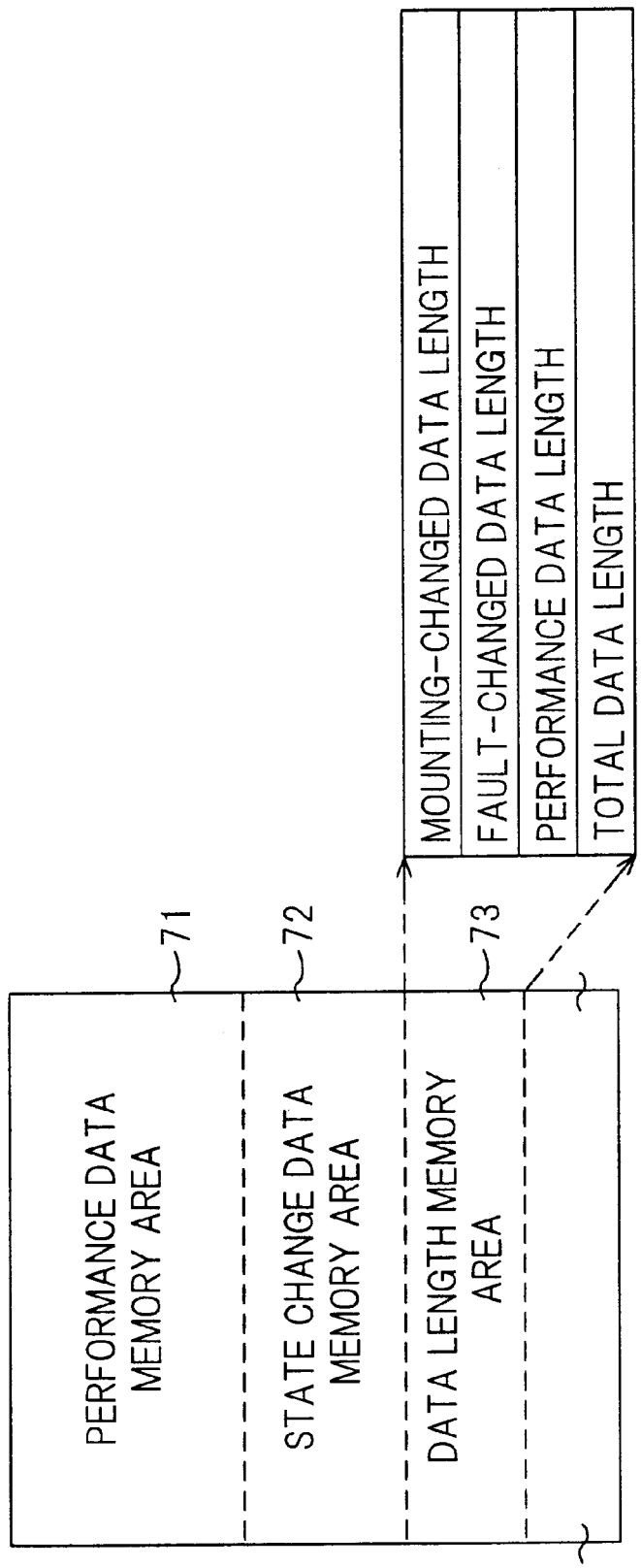
FIG. 8 is a diagram showing the contents of a supervisory information memory provided in the individual supervisory device.

As shown in FIG. 8, each of the supervisory information memories 21$_{13}$–21$_{83}$ of the individual supervisory devices 11$_1$–11$_8$ includes an area 71 for storing the performance data, an area 72 for storing state change information indicating whether there is a change in state, and an area 73 for storing the length of data to be sent (data length).

The performance data stored in the area 71 has been described with reference to FIGS. 2 and 3.

As shown in FIG. 8, the data length stored in the area 73 includes a data length changed by mounting, a data length changed due to occurrence of a fault, the length of performance data, and a total data length. The data lengths stored in the area 73 are used to determine the communication rate (maximum band) at which the change data is sent to the centralized supervisory device 12. Since the centralized supervisory device 12 manages the states of all the supervisory items of the individual supervisory devices 11$_1$–11$_8$, it is sufficient to send the performance data on only changed states (change data) to the centralized supervisory device 12 from the individual supervisory devices 11$_1$–11$_8$. That is, it is not necessary to send the performance data on states which are not changed to the centralized supervisory device 12. Hence, it is required that, if a state change occurs, the individual supervisory devices 11$_1$–11$_n$ send, by the control signal cells, change data on the new state to the centralized supervisory device 12. At this time, the individual supervisory devices 11$_1$–11$_8$ send the respective data lengths stored in the area 73 to the centralized supervisory device 12 in order to request the centralized supervisory device 12 to determine the respective maximum bands at which the control signal cells for transmitting the change data are sent.

The state change information stored in the area 72 is data which indicates whether there is a state change and is sent, by using the ACK cells at the time of polling, to the centralized supervisory device 12 from the individual supervisory devices 11$_1$–11$_8$. The state change information consists of 16 bytes. By referring to the state change information, the centralized supervisory device 12 can determine whether there are changes in the states of the individual supervisory devices 11$_1$–11$_8$ and determine what changes occur and where.

Figure 9:
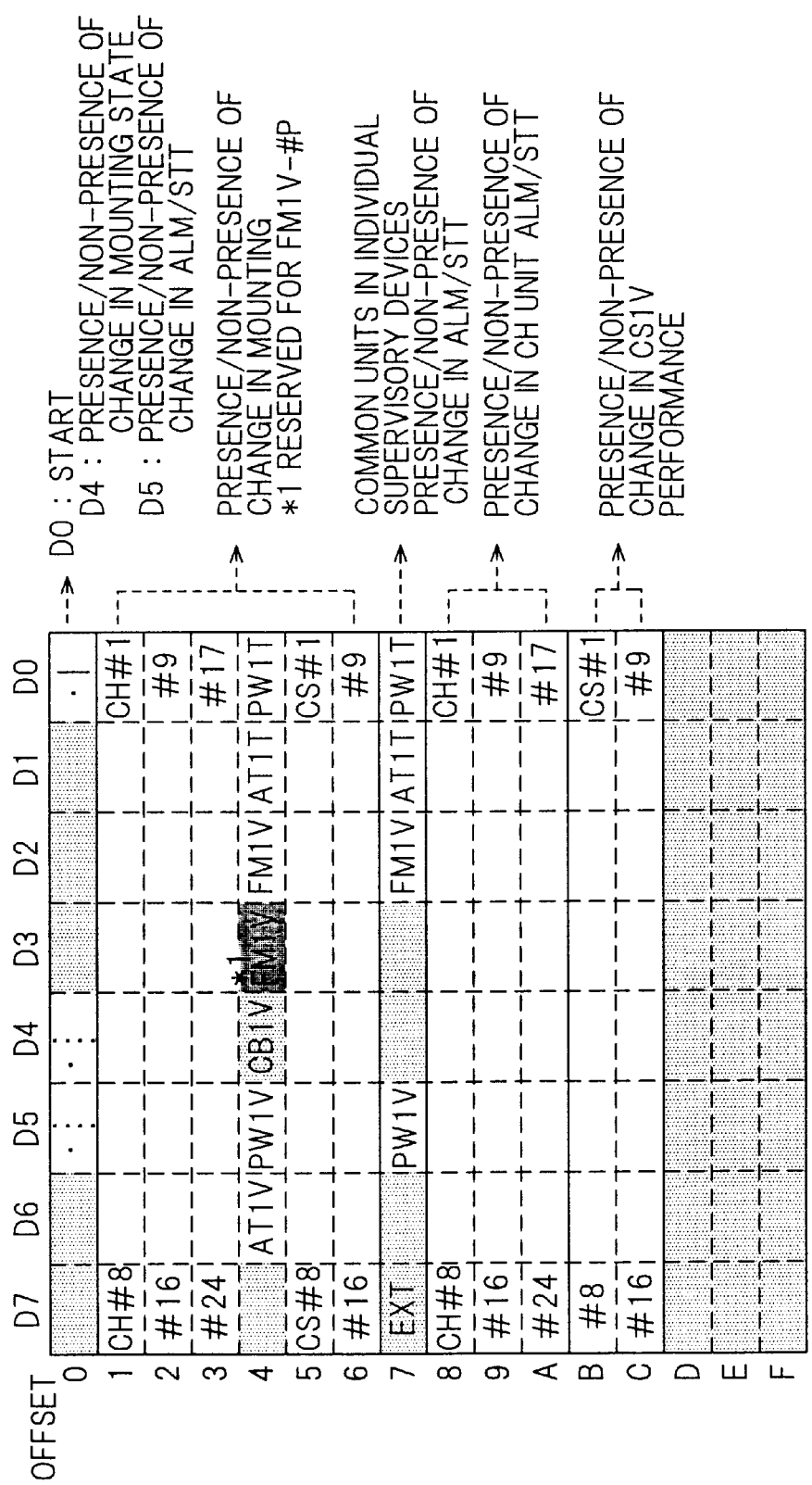
FIG. 9 is a diagram showing data (state change information) to be sent to the centralized supervisory device from the individual supervisory device at the time of polling.

FIG. 9 is a diagram explaining the state change data. A bit D4 located in offset 0 indicates whether there is a change in the mounting state. A bit D5 located in offset 0 indicates whether there is a change in an ALM/STT (Alarm/Status), which indicates a fault event. Data in offsets 1 to 6 indicates in which channel among channels #1–#24 a change in the mounting state occurs. Data in offset 7 indicates in which common unit in the individual supervisory device a change in the ALM/STT occurs. Data in offsets 8 to A indicates in which channel among channels #1–#24 a change in the ALM/STT occurs. Data in offsets B–C indicates in which channel a performance change occurs. Each individual supervisory device includes a plurality of units (cards), which have finely shared functions and are mounted in a shelf. In FIG. 9 symbols FM1V, AT1T, PW1T, CB1V, AT1V, PW1V, CH#1–CH#24, and CS#1–CS#16 denote the name of units as described above. A change in the mounting state means the states of the units with respect to the shelf, and more particularly means that a unit is removed from the shelf which is working or a unit is inserted therein. The above-mentioned ALM/STT denotes a fault event which occurs in a unit. The centralized supervisory device 12 supervises state changes as described above, and collects information on the states when the states are changed.

(e) Cell Format

Figure 10:
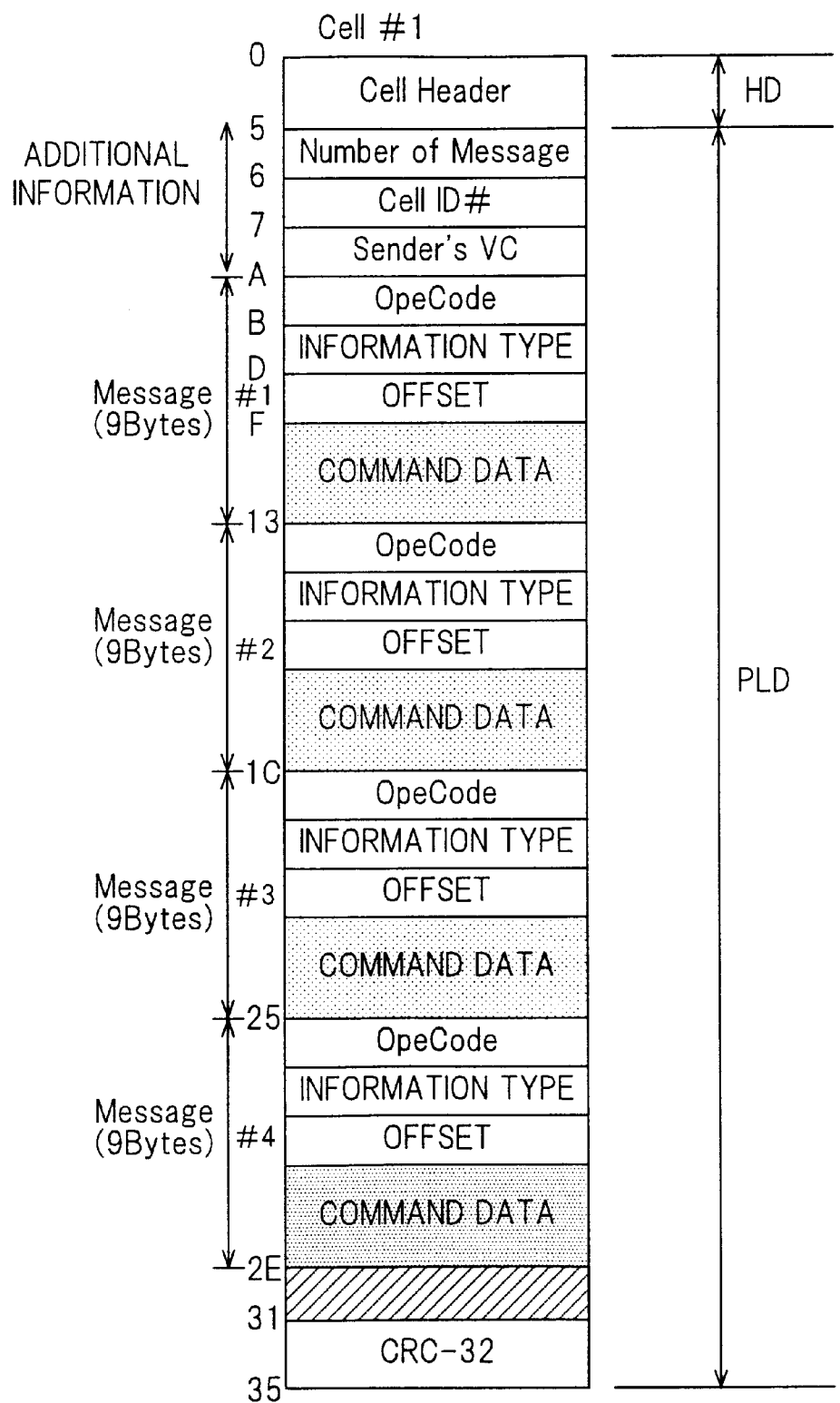
FIG. 10 is a diagram of a format of a control signal cell.

FIG. 10 a diagram showing a format of the control signal cell used in the present invention. The control signal cell is made up of a cell header HD of 5 bytes, and a payload PLD of 48 bytes. The payload PLD includes four blocks of messages, each having 9 bytes, and additional information. The additional information includes the number of valid messages, the cell identifier (Cell ID#), and a VC indicating a transmission source (Sender's VC). Each of the 9-byte messages includes an operation code, information type, offset and command data. In order to reduce the communication load, the communication protocol is directed to only executing the read/write operation on the memories, and the operation code is directed to specifying any of the read, write and ACK operations. More particularly, when the operation code is equal to 0, 1 and 2, the read, write and ACK operations are indicated, respectively. The command data is data (transmission data) of 6 bytes to be sent to another party. One control signal cell is capable of transmitting data of 24 bytes. As shown in FIG. 11, the information type data has five upper bits which indicate the types of supervise, Prov, control, scan and command, and three lower bits indicating the detail of the types. For example, if the transmission data is alarm performance data, the five upper bits of the information type are "00001" and the three lower bits thereof are "010".

The items of the performance shown in FIG. 11 are defined as follows. The inventory denotes a unit identity code, and ALM and STT denote the fault event. A symbol FM1V S/W Ver. denotes the version of software installed in the FM1V unit, which is the supervisory device. In the items of the Prov, CH common Prov/CH independent Prov denotes information set to the CH units (different on the unit base), and a CRC THRS value denotes threshold information for notification of a transmission line error. Further, B. W assign denotes setting information concerning the band width. In the items of the control, LED information is control information concerning LEDs provided to each unit, and PWR Cont. is control information concerning an auxiliary power supply. The items of the scan indicate which information an upper device completely collects. The items of the command include trigger information for execution of a command directed to a lower device from an upper device and information indicating the result of execution of the command.

(f) Communication Sequence

Figure 12:
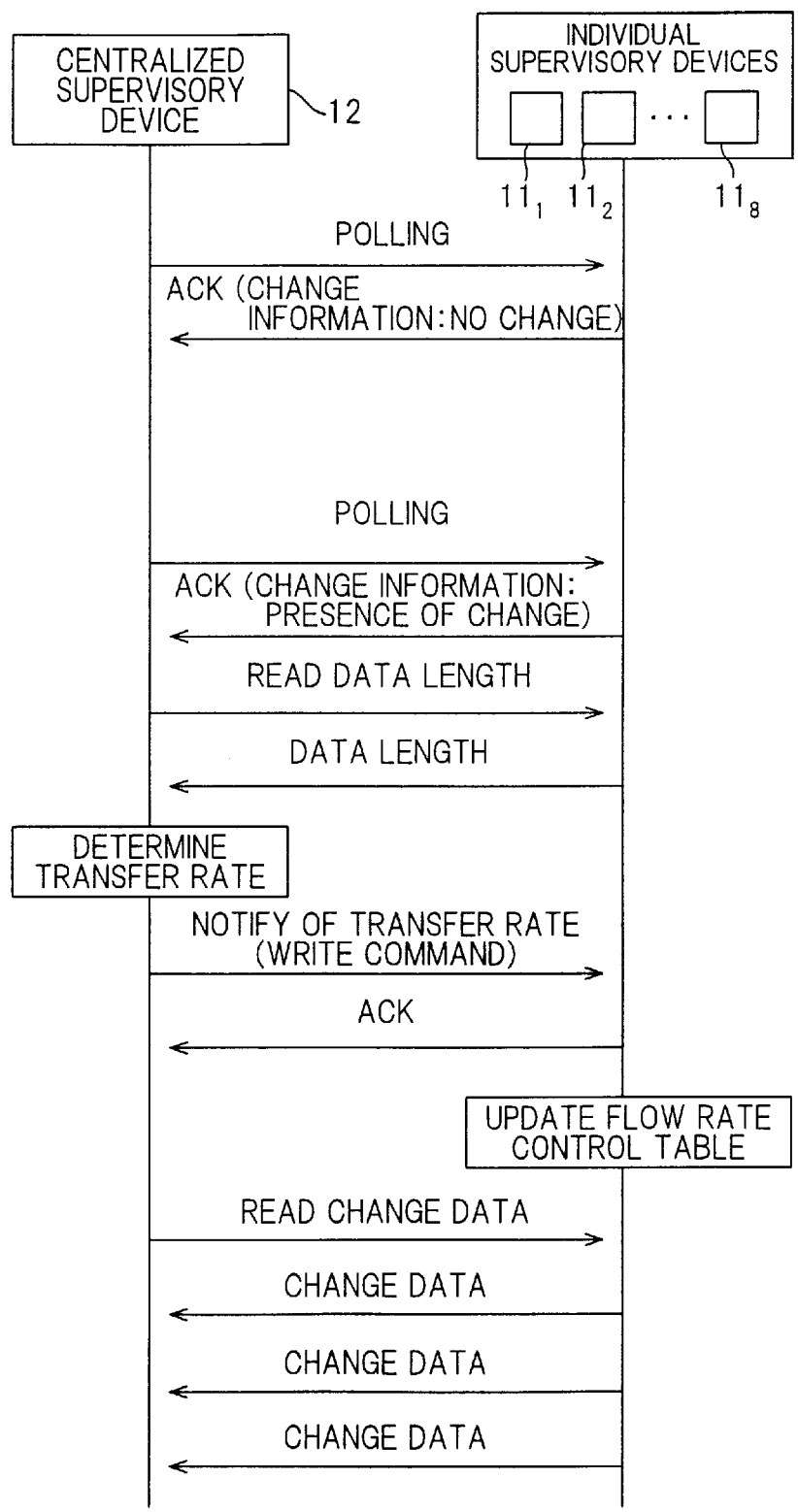
FIG. 12 is a diagram of a communication sequence between the centralized supervisory device and individual supervisory devices.

FIG. 12 is a diagram of a communication sequence between the centralized supervisory device 12 and the individual supervisory devices $11_1$–$11_8$.

The CPU 52 (FIG. 7) of the centralized supervisory device 12 cyclically instructs the communication parts $22_1$–$22_8$ to execute the polling in order. For example, the centralized supervisory device 12 commences instructing the communication part $22_1$ to execute the polling. The CPU 44 (FIG. 6) of the communication part $22_1$ sends the cell for the polling to the individual supervisory device $11_1$ via the cell assemble/disassemble part 46 and the frame assemble/cell separate part 45. The polling cell is directed to reading the state change information (see FIG. 9) from the supervisory information memory $21_{13}$ (FIG. 4) of the individual supervisory device $11_1$, and the operation code thereof is "read".

The frame assemble/cell separate part 34 and the cell assemble/disassemble part 35 (FIG. 4) of the individual supervisory device $11_1$ supply the messages and the additional information included in the polling cell to the CPU 33. Then, the CPU 33 reads the state change information from the supervisory information memory $2_{13}$, and supplies the read state change information to the cell assemble/ disassemble part 35. Then, the cell assemble/disassemble part 35 maps the state change information in the payload PLD, and applies an ACK cell thus formed to the frame assemble/cell separate part 34. Then, the frame assemble/ cell separate part 34 inserts the ACK cell into the main signal cell, and sends the frame thus formed to the centralized supervisory device 12.

The CPU 44 of the communication part $22_1$ of the centralized supervisory device 12 receives the state change information mapped in the ACK cell via the frame assemble/ cell separate part 45 and the cell assemble/disassemble part 46, and checks whether there is any change in the performance states of the individual supervisory device $11_1$ by referring to the received state change information. In this case, there is no change in the performance state, and thus the CPU 44 notifies the CPU 52 of the above fact.

Upon receiving the above notification, the CPU 52 instructs the next communication part $22_2$ to execute the polling. The CPU 44 of the communication part $22_2$ sends the polling cell to the individual supervisory device $11_2$ via the cell assemble/disassemble part 46 and the frame assemble/cell separate part 45. The CPU 33 of the individual supervisory device $11_2$ receives the messages and the additional information included in the polling cell via the frame assemble/cell separate part 34 and the cell assemble/ disassemble part 35. Hence, the CPU 33 reads the state change information from the supervisory information memory $21_{33}$, and sends the ACK cell, in which the read state change information is mapped, to the centralized supervisory device 12 via the cell assemble/disassemble part 35 and the frame assemble/cell separate part 34. The CPU 44 of the communication part $22_2$ of the centralized supervisory device 12 receives the state change information mapped in the ACK cell via the frame assemble/cell separate part 45 and the cell assemble/disassemble part 46, and recognizes that there is no change in the performance states of the individual supervisory device $11_2$ by referring to the received state change information.

If the CPU 44 recognizes that there is a change in the performance states, the CPU 44 creates a control signal for reading the data length, and applies the control signal to the cell assemble/disassemble part 46. Then, the cell assemble/ disassemble part 46 creates cells for reading the data length by using the control signal for reading the data lengths, and sends the cells thus created to the individual supervisory device $11_2$ via the frame assemble/disassemble part 45. The CPU 33 of the individual supervisory device $11_2$ receives the messages and additional information included in the cells for reading the data length via the frame assemble/cell separate part 34 and the cell assemble/disassemble part 35. Thus, the CPU 33 reads the information concerning the data length (see FIG. 8) from the supervisory information memory $21_{23}$, and sends the data length cell, in which the above data length information is mapped in the payload, to the centralized supervisory device 12 via the cell assemble/disassemble part 35 and the frame assemble/cell separate part 34. The CPU 33 of the communication part $22_2$ of the centralized supervisory device 12 receives the data length cell via the frame assemble/cell separate part 45 and the cell assemble/ disassemble part 46, and determines, based on the received data length, a transfer rate (the maximum band for the control signal cells) in accordance with a process flow shown in FIG. 13, which will be described later.

Thereafter, the communication part $22_2$ creates a cell including, as a message, the above transfer rate and an operation code "write", and sends the cell to the individual supervisory device $11_2$. When the CPU 33 receives the transfer rate via the frame assemble/cell separate part 34 and the cell assemble/disassemble part 35, the CPU 33 sends the ACK cell indicating receipt of the transfer rate to the centralized supervisory device 12. Further, the CPU 33 changes the maximum band MBc for the control signal cells in the flow rate control table 36 by the notified transfer rate, and reduces the maximum band MBs for the main signal cells by α.

Subsequently, the communication part $22_2$ of the centralized supervisory device 12 sends the change data read cell to the individual supervisory device $11_2$. In response to the change data read cell, the CPU 33 of the individual supervisory device $11_2$ applies the performance data having a state change read from the supervisory information memory $21_{23}$ to the cell assemble/disassemble part 35. Then, the cell assemble/disassemble part 35 assembles the applied performance data into the control signal cells, which are applied to the frame assemble/cell separate part 34. Then, the frame assemble/cell separate part 34 refers to the maximum band MBc for the control signal cells stored in the flow rate control table 36, and maps a given number of control signal cells in the payload of the SONET OC3 frame so that a transfer rate corresponding to the maximum band MBc can be obtained. The frame thus obtained is sent to the centralized supervisory device 12. The CPU 44 of the communication part $22_2$ of the centralized supervisory device 12 receives, via the frame assemble/cell separate part 45 and the cell assemble/disassemble part 46, the performance data concerning the state changes (change data) contained in the control signal cells, and revises the old data in the supervisory information memory 43 by the received change data. Thereafter, when the CPU 44 of the centralized supervisory device 12 receives all change data, it notifies the CPU 52 of receipt of all the change data.

In response to the above notification, the CPU 52 instructs the next communication part $22_3$ to execute the polling. Hence, the above sequence is repeatedly carried out. The CPU 52 reads the performance data from the supervisory information memory 43 of the communication part $22_2$, and revises the old data in the centralized supervisory memory 51 by the read performance data.

(g) Transfer Rate Determining Process

Figure 13:
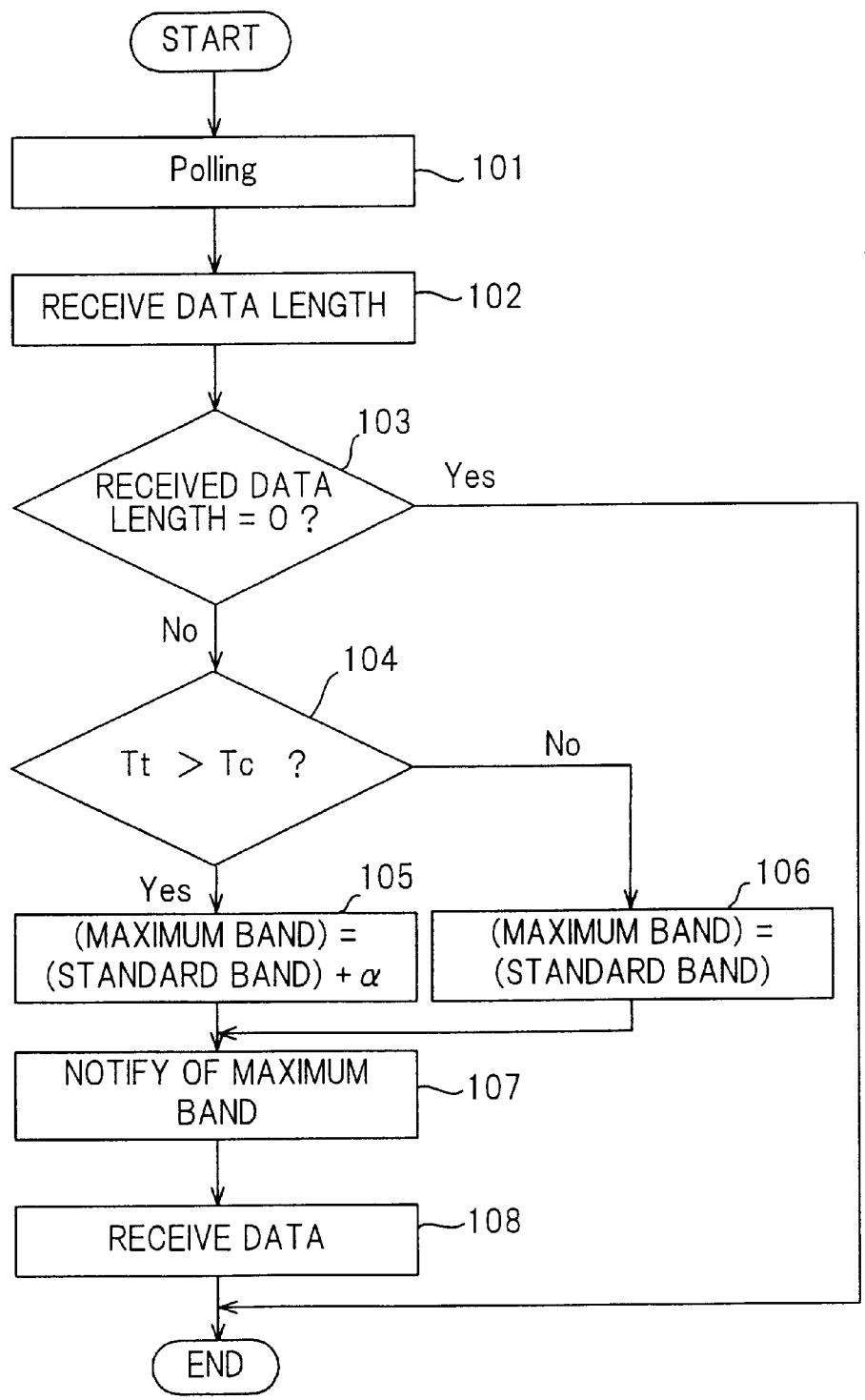
FIG. 13 is a flowchart of a transfer rate determining process at which the control signal cells are transferred by the centralized supervisory device.

FIG. 13 is a flowchart of a transfer rate determining process that is executed in the centralized supervisory device 12.

When the CPU 44 of the communication part of the centralized supervisory device 12 receives the data length from the individual supervisory device of interest after the polling (steps 101 and 102), the CPU 44 determines whether the received data length is equal to 0 (step 103). If it is determined that the received data length is equal to 0, the CPU 44 ends the process. If it is determined that the received data length is not equal to 0, the CPU 44 divides the above data length by the standard band SBc for the control signal cells so that a transfer time Tt in the standard band can be computed, and compares the transfer time Tt with the standard transfer time Tc (step 104). If the computed transfer time Tt is longer than the standard transfer time Tc, the CPU 44 recognizes that it takes an excessively long time to execute the data transfer, and increases the maximum band for the control signal cells in accordance with the following expression (step 105):

(maximum band)=(standard band)+α(>0)

where is an arbitrary band width. If the computed transfer time Tt is equal to or shorter than the standard transfer time Tc, the CPU 44 sets the maximum band MBc to the standard band SBc (step 106).

After the maximum band is thus obtained, the CPU 44 notifies the individual supervisory device of the maximum band (step 107). The individual supervisory device transfers the control signal cells to the centralized supervisory device 12 at the transfer rate corresponding to the notified maximum band. Then, the centralized supervisory device 12 receives the control signal cells and performs a predetermined process for the received cells (step 108).

As described above, if it takes an extremely long time to transfer data in the standard band, the band is increased so that the transfer rate is increased. Hence, the data transfer time can be reduced.

Figure 14:
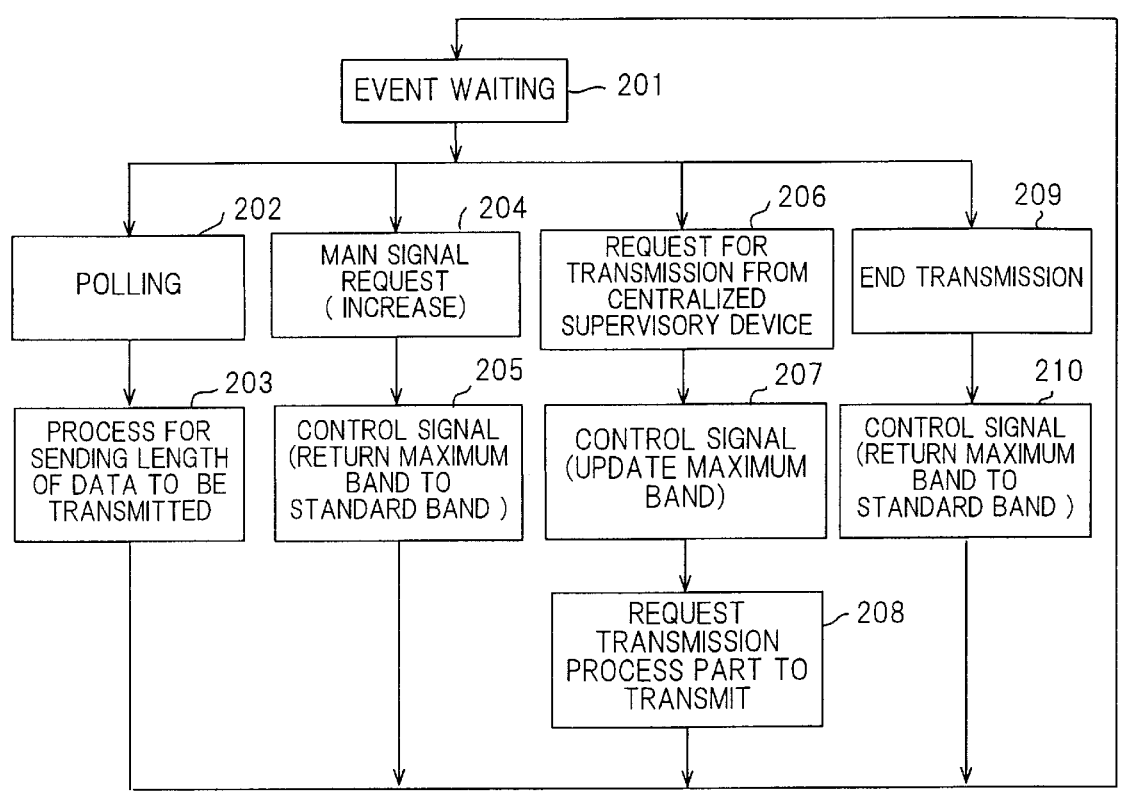
FIG. 14 is a flowchart of a process executed by a CPU provided in the individual supervisory device.
Figure 15:
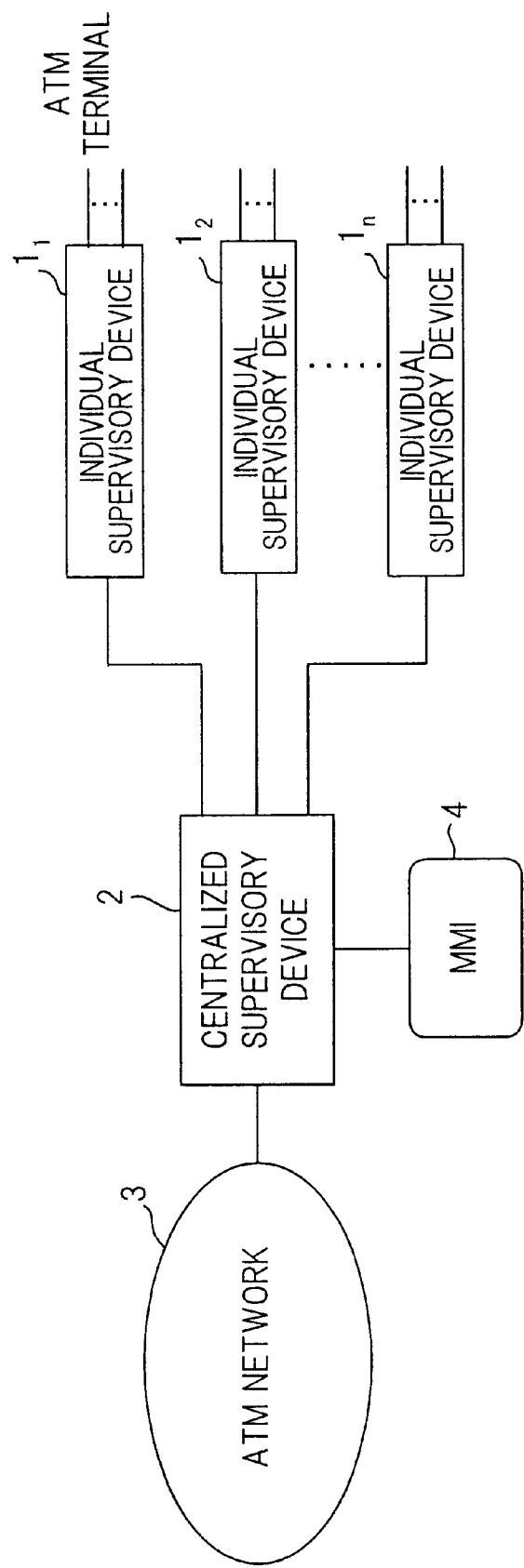
FIG. 15 is a diagram of a structure of a conventional centralized supervisory system.
Figure 16:
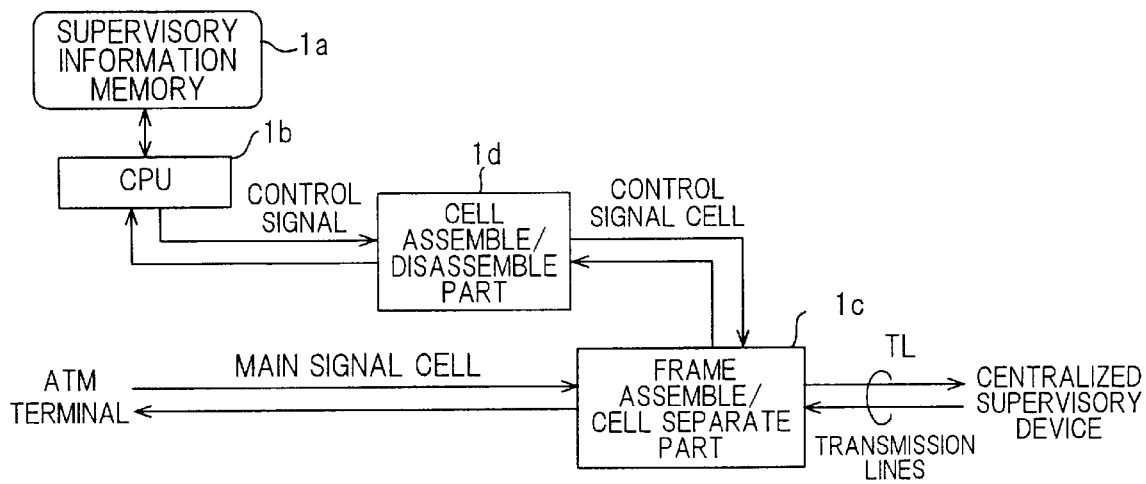
FIG. 16 is a diagram of a structure of a communication part provided in a conventional individual supervisory device.
Figure 17:
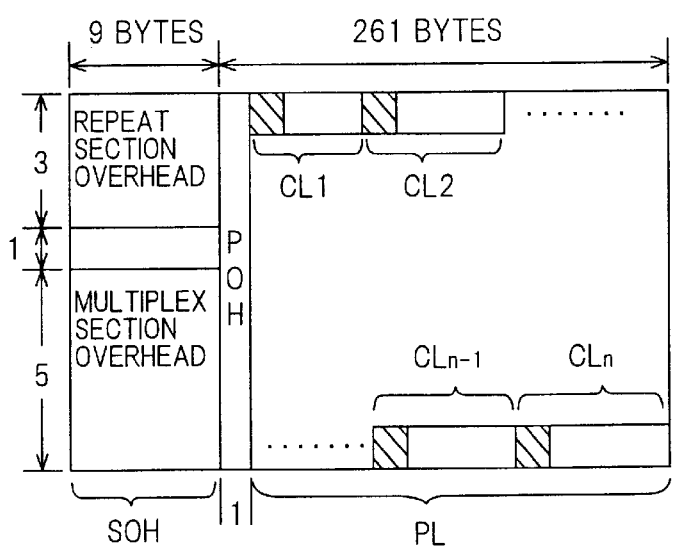
FIG. 17 is a diagram of a SONET OC3 frame format.
Figure 18:
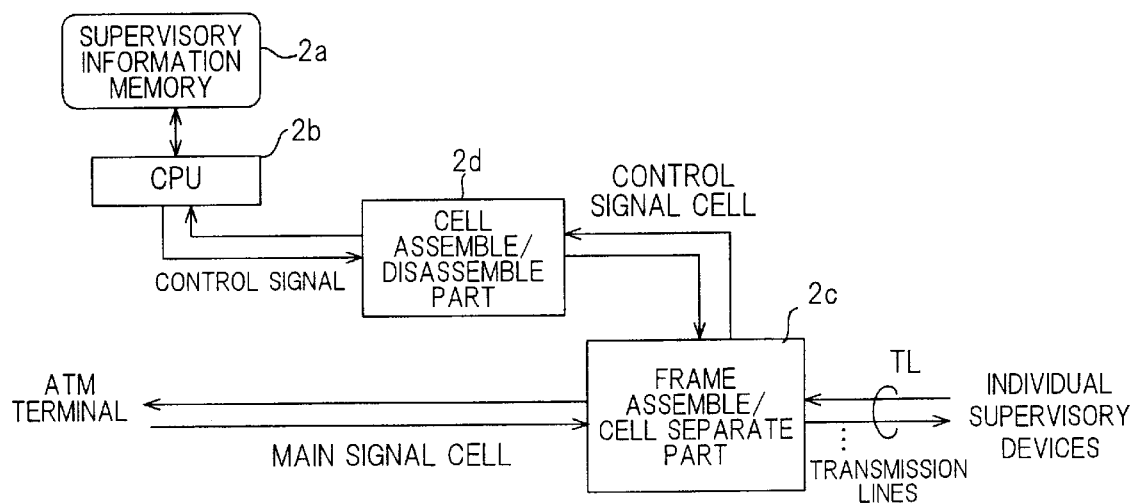
FIG. 18 is a diagram of a structure of a communication part of the conventional centralized supervisory device.
Figure 19:
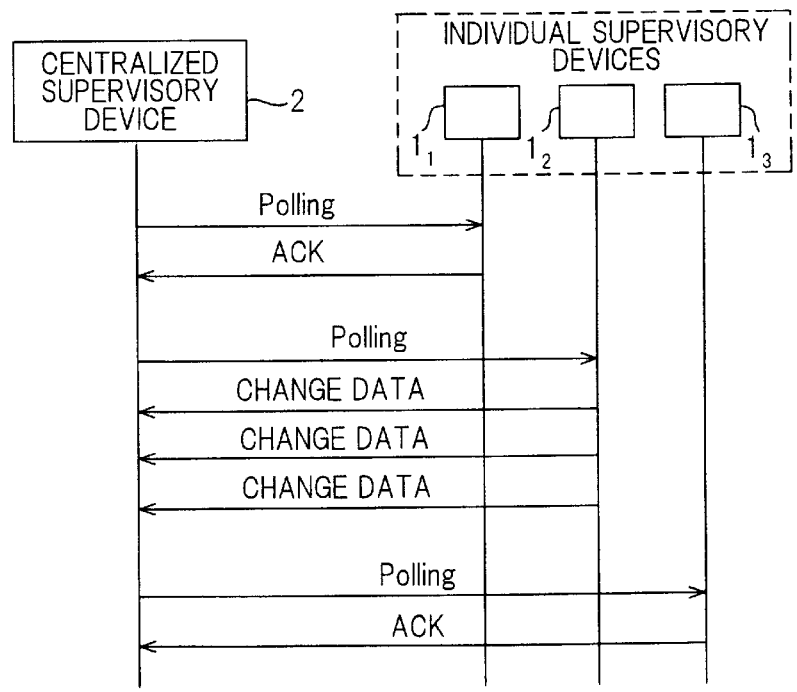
FIG. 19 is a diagram of a conventional supervisory sequence.

(h) Process Flow of Individual Supervisory Devices:

FIG. 14 is a flowchart of a process executed by the CPU 33 provided in each of the individual supervisory devices $11_1$–$11_8$.

If the CPU 33 receives the polling cell from the centralized supervisory device 12 (step 202) in the event waiting state (step 201), the CPU 33 checks whether there is any performance data having a state change to be transmitted, and sends the data length information to the centralized supervisory device 12 if the check result is affirmative (step 203). Then, the CPU 33 returns to the event waiting state.

In the event waiting state (step 201), the main signal flow rate monitor circuit 32 (FIG. 4) supervises the flow rate of the main signal cells. If the flow rate of the main signal is increased and becomes greater than the maximum band MBs for the main signal, the main signal flow rate monitor circuit 32 notifies the CPU 33 of the above fact (step 204). Upon receiving the above notification, the CPU 33 reduces the maximum band MBc (=SBc+α) to the standard band SBc, and increases the maximum band MBs for the main signal by α. Hence, the band can be controlled so that the main signal cells can be prevented from being discarded and the services for the main signal can be ensured (step 205).

In the event waiting state, if the maximum band is indicated by the centralized supervisory device 12 and then a transmission request is sent (step 206), the CPU 33 updates the maximum band for the control signal cells in the flow rate control table 36 (step 207), and requests the transmission process part (frame assemble/cell separate part and cell assemble/disassemble part) to send change data (step 208).

In the event waiting state, when the transmission of the change data to the centralized supervisory device 12 is completed (step 209), the CPU 33 returns the maximum band for the control signal cells in the flow rate control table 36 to the standard band (step 210).

According to the present invention, the maximum band for the control signal cells is determined based on the length of transmission data, and thus the data is transmitted at the bit rate corresponding to the maximum band thus determined. Hence, it is possible to send the necessary data to the centralized supervisory device from each individual supervisory device within a specified time and to thus ensure the real-time performance and improve the reliability of system maintenance.

Also, according to the present invention, the standard band and the standard transfer time for the control signal are predetermined. Then, the transfer time in the standard band is obtained by dividing the data length by the standard band, and is compared with the standard transfer time. If the transfer time thus computed is longer than the standard transfer time, the maximum band for the control signal cells is set to (standard band)+α(>0). Hence, data is transferred at the rate corresponding to the maximum band thus obtained. Thus, necessary data can definitely be transmitted to the centralized supervisory device from each individual supervisory device within the specified time, so that the real-time performance can be ensured and the reliability of system maintenance can be improved.

Further, according to the present invention, if the number of main signal cells is increased while the control signal cells are being transferred in the maximum band equal to (standard band)+α(>0), the transfer rate for the control signal cells is reduced to the transfer rate for the standard band from the transfer rate for the above maximum band and simultaneously the maximum band for the main signal is increased. Hence, it is possible to prevent the main signal cells from being discarded and to thus ensure the services for the main signal.

As many apparently widely different embodiments of the present invention can be made without departing from the spirit and scope thereof, it is to be understood that the invention is not limited to the specific embodiments thereof except as defined in the appended claims.

What is claimed is:

1. A communication method in a centralized supervisory system having a plurality of individual supervisory devices which supervise a variety of performance for each connection identifier of a main signal and create supervisory information and which assemble control signal cells including the supervisory information and main signal cells into frames, which are then sent to transmission lines, and a centralized supervisory device which collects the supervisory information included in the control signal cells from the individual supervisory devices and sends the main signal cells to a network, said communication method comprising the steps of:

determining, for each of the individual supervisory devices, maximum band for control signal on the basis of length of data to be transmitted;

arranging, in each of the individual supervisory devices, a given number of control signal cells in each frame so that the control signals are transmitted within the maximum band; and sending, via transmission line, the frames to the centralized supervisory device from each individual supervisory device.

2. The communication method in the centralized supervisory system as claimed in claim 1, further comprising the steps of:

sequentially sending a polling cell for collecting the supervisory information to the individual supervisory devices;

sending, from each of the individual supervisory devices in response to the polling cell, the length of data to be transmitted to the centralized supervisory device; and determining, in the centralized supervisory device, the maximum band for the control signal for each of the individual supervisory device on the basis of the length of data and notifying the maximum band thus determined to the individual supervisory device, wherein each of the individual supervisory devices sends the control signal cells to the centralized supervisory device within the maximum band.

3. The communication method in the centralized supervisory system as claimed in claim 2, wherein the step of determining the maximum band comprises the steps of:

setting, for each of the individual supervisory devices, a standard band and a standard transfer time for the control signals;

computing a transfer time in the standard band by dividing the corresponding length of data by the standard band;

comparing the transfer time thus computed with the standard transfer time;

computing the sum of the standard band and $\alpha$ ($>0$); and setting the sum as the maximum band for the control signals if the transfer time computed is longer than the standard transfer time.

4. The communication method in the centralized supervisory system as claimed in claim 3, wherein the step of determining the maximum band comprises a step of setting, the standard band as the maximum band for the control signals if the transfer time computed is equal to or shorter than the standard transfer time.

5. The communication method in the centralized supervisory system as claimed in claim 3, further comprising the steps of:

supervising, in each of the individual supervisory devices, an increase in the number of main signal cells; and reducing the maximum band for the control signals to the standard band and increasing the maximum band for the main signal if the number of main signal cells is increased while the control transfer cells are being transferred at the maximum band determined.

* * * * *